United States Patent [19]

Bender et al.

[11] Patent Number: 5,101,730
[45] Date of Patent: Apr. 7, 1992

[54] RING PELLETS FOR GAS GENERATORS

[75] Inventors: Richard Bender, Lauf; Gerrit Scheiderer; Hans Winkler, both of Fürth, all of Fed. Rep. of Germany

[73] Assignee: Dynamit Nobel Aktiengesellschaft, Fed. Rep. of Germany

[21] Appl. No.: 552,118

[22] Filed: Jul. 13, 1990

[30] Foreign Application Priority Data

Jul. 13, 1989 [DE] Fed. Rep. of Germany ....... 3923046

[51] Int. Cl.$^5$ .............................................. C06B 45/12
[52] U.S. Cl. .................................. 102/288; 102/289; 102/373; 86/10
[58] Field of Search .................... 86/10; 102/373, 288, 102/289

[56] References Cited

U.S. PATENT DOCUMENTS

| | | | |
|---|---|---|---|
| 677,528 | 7/1901 | Maxim | 102/24 |
| 3,175,497 | 3/1965 | Head | 102/98 |
| 3,492,815 | 2/1970 | McCullough | 60/39.47 |
| 3,756,025 | 9/1973 | McCullough | 60/255 |
| 4,817,828 | 4/1989 | Goetz | 102/288 X |
| 4,846,368 | 7/1989 | Goetz | 102/288 X |

*Primary Examiner*—Peter A. Nelson
*Attorney, Agent, or Firm*—Antonelli, Terry Stout & Kraus

[57] ABSTRACT

Ring pellets for gas generators exhibit optimum reaction rates by having configurations which optimize such rates. The pellet has a central ignition duct; from the latter, outlet channels extend radially toward a rim of the pellet. Specific embodiments contain, on the topside and underside of the pellets, either conical recesses or annular channels or both. The pellets preferably exhibit a proportion of surface area/unit weight of from 4 to 7 cm$^2$/g, which can be set by variation of the channels and, respectively, of the recesses to obtain a desired value. The higher this value, the greater the reaction rate. The ring pellets are especially well suited for airbag generators which must display differently high reaction rates on the driver's side and on the front-seat passenger's side, and which are to exhibit at the same time a high breaking and abrasion stability.

17 Claims, 2 Drawing Sheets

RING PELLETS FOR GAS GENERATORS

BACKGROUND OF THE INVENTION

The present invention relates to ring pellets for gas generators having a central ignition channel. Such pellets serve for the production of gases or gaseous mixtures as utilized, for example, in airbags for automotive vehicles.

Ring pellets having a central, axially symmetrical middle channel have been disclosed in DE 3,416,736-C2. Nubs (called extensions therein) are arranged on the topside and underside of these pellets, the outer diameter of these nubs being smaller than the outer diameter of the entire pellet. These pellets are utilized in propellant charge igniters where they are arranged in an igniter tube, stacked one on top of the other to form a column. The arrangement of the nubs has the result that a free space is created between an inner wall of the igniter tube and the pellet, preventing the formation of an undesirable pressure buildup within the igniter tube.

However, the ring pellets described in DE 3,416,736-C2 are not suitable for use in gas generators since the pellets described in the reference develop hot gases serving for the ignition of the propellant charge surrounding the igniter tube. In contrast thereto, ring pellets for gas generators are to deliver maximally cool gases so that the problems playing a large part in case of pellets for propellant charge igniters are of subordinate importance in these pellets. For this reason, ring pellets for gas generators are disclosed in DE 3,742,656-A1 wherein the nubs are arranged only within a small annular region on the topside and underside of the pellets so that these nubs are not flush with the rim of the pellet at any point. In accordance with statements made in this patent, this arrangement permits a quick deflagration of the pellets. However, it has been found that with this type of pellet design, the gas conductance of the vapors produced during the combustion of the pellets is not at an optimum so that these pellets frequently show inadequate reaction rates.

Therefore, the problem was to be solved of developing pellets for gas generators which, when arranged into a stack, combust quickly in a readily controllable fashion, and the vapors of which are rapidly exhausted or discharged.

SUMMARY OF THE INVENTION

In meeting this objective, ring pellets for gas generators have now been produced which exhibit a central, axially symmetrical channel and are characterized in that the pellets have outlet channels on their topside and underside extending radially from the central channel to the pellet rim.

The number of channels depends on the desired reaction velocity of the pellet and on the outer diameter of the pellet. The total outer diameter of the pellets is to range generally between 20 and 40 mm. The reaction rate is dependent on the ratio of surface area/unit weight so that it is possible to vary the reaction rates of the pellets at will, inter alia, also by varying the number of channels and/or the outer diameter of the pellets.

The pellets exhibit preferably between 4 and 10 outlet channels arranged on the underside as well as the topside of the pellets. However, it is also possible to provide such channels on only one side of the pellets. These channels lead in a ray shape from the central channel to the pellet rim. The depth of these channels can be up to one-third of the height of the pellet. The channels emanate from the central channel preferably in an axially symmetrical fashion so that the angles formed by the axes of two neighboring channels are always identical.

It is furthermore advantageous to keep the numbers of outlet channels on the topside and on the bottom side of the pellets identical. In this connection the channels on the bottom side should be arranged offset with respect to the channels on the topside.

An especially effective embodiment of the ring pellets according to this invention resides in that the pellets either exhibit a conical recess in the topside and/or underside of the pellets and/or that a centrally symmetrical annular channel is provided between the central axially symmetrical channel and the pellet rim.

The conical recess is arranged centrally symmetrically around the ignition channel, i.e., the central channel. The greatest depth of this recess is located in the middle of the pellet; this depth amounts maximally to one-third the pellet height. The radius of this recess can be up to 4/5 of the radius of the pellet. Preferably, it amounts to between 50 and 75% of the radius of the total pellet.

In a further specific embodiment of the pellet according to this invention wherein annular channels are located within the topside and/or underside of the pellet, the center for these annular channels lies at or o the axis of the pellet. In this arrangement, the radius of an annular channel on the topside of the pellet can also be different as compared with the radius of the annular channel on the underside. Preferably, however, the annular channels on the topside and underside exhibit identical radii. The difference between the outer and inner radii of these annular channels, also called their width hereinbelow, can be maxially likewise 4/5 of the radius of the ring pellet, i.e. the length of the radius to the outer rim of the pellet.

The depth and the radii of the conical recesses and, respectively, of the annular channels depend on the desired total surface area of the ring pellet which surface area, in turn, affects the desired reaction rate.

In fulfilling the above-mentioned objective it has, namely, been found furthermore what ranges must be maintained for the ratio of surface area to pellet weight in order to attain optimum reaction velocities of the pellet for generating gases for a gas generator. In general, this ratio is to range from 4 to 7 $cm^2/g$; in the presence of a conical recess, this ratio can be reduced down to 3 $cm^2/g$ whereas in case of the presence of an annular channel, this ratio can be increased to up to 8 $cm^2/g$. The higher this value, the greater the reaction rate of the pellet. By a corresponding variation of the radii of the aforementioned recesses and also the number of outlet channels, it is thus possible to adjust the reaction rates of the pellets to any desired value.

The aforementioned relationships between surface area/weight and reaction rate of the pellets apply preferably to those pellets containing, as the effective gas-releasing material, a mixture of 40 to 70% by weight of sodium azide and 10 to 30% by weight of potassium nitrate in correspondence with the information in German Patent 3,842,838 (Patent Application P 38 42 838.5) corresponding to U.S. application Ser. No. 453,944 filed Dec. 19, 1989, the subject matter of which is incorporated herein by reference. However, the pellets can also contain as the gas-producing material other compounds or mixtures, such as, for example, those based on nitrides and oxidizing agents.

The pellets according to this invention, for reasons of breaking resistance, exhibit generally a height lying above 3.0 mm. The proportion of diameter: height of the pellet can be up to 10:1; preferably, this proportion ranges between 6:1 and 4:1.

The pellets are manufactured conventionally by pressmolding in dies exhibiting designs corresponding to the desired geometry of the pellets.

BRIEF DESCRIPTION OF THE DRAWINGS

The pellets according to this invention will be described with reference to FIGS. 1 to 6 of the accompanying drawings wherein identical numerals in all cases denote identical parts of the pellets and wherein.

DESCRIPTION OF THE PREFERRED EMBODIMENTS

Figure 1:
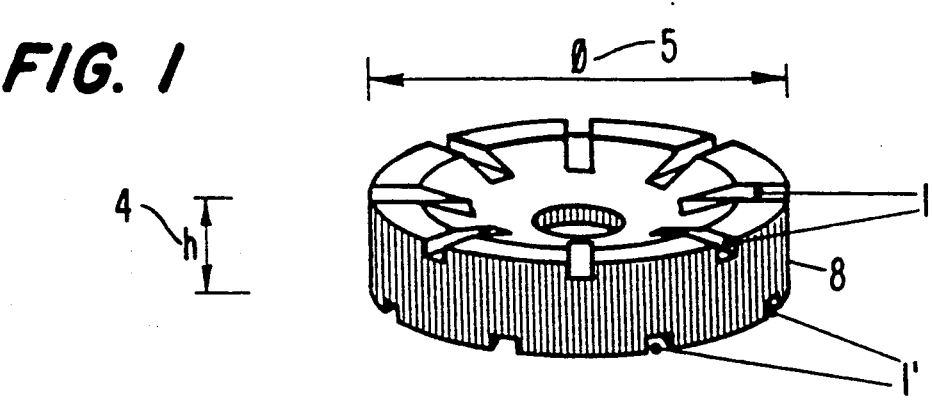
FIG. 1 is a perspective view of an embodiment of a pellet having a conical recess surrounding an axially arranged central opening or channel.
Figure 2:
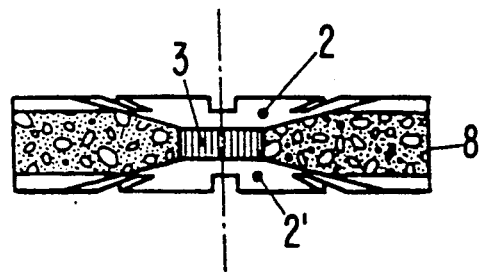
FIG. 2 is a cross-section of the pellet shown in FIG. 1.
Figure 3:
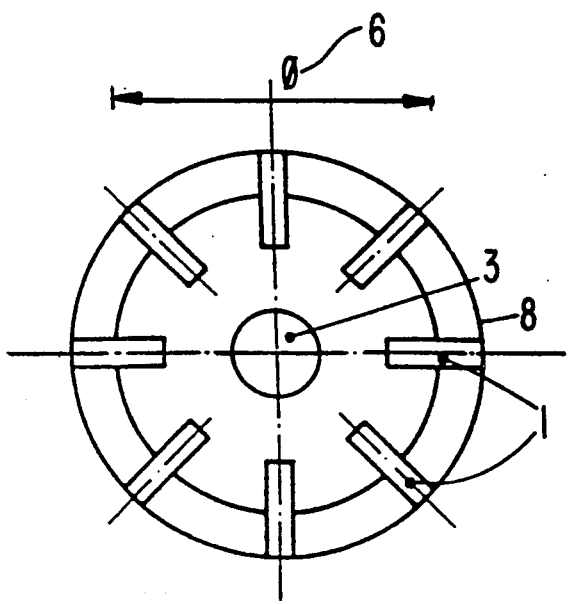
FIG. 3 is a top or plan view of the pellet shown in FIG. 1.

FIGS. 1-3 as heretofore noted show an embodiment of the pellet having a conical recess 2. In FIG. 1, the position of the radially extending outlet channels 1 and 1' in pellet 8 can clearly be seen. The ratio of the diameter (0) 5 to the height (h) 4 is in this case about 4.4:1. The outlet channels 1 on the topside are arranged to be offset with respect to the outlet channels 1' on the underside of the pellet.

FIG. 2 shows an axial section through the pellet 8 wherein the conical recesses 2 and 2', respectively, on the topside and bottom side of the pellet can be clearly seen. Reference numeral 3 designates the axially symmetrical central channel wherein the conical recesses 2 and 2' terminate centrally.

FIG. 3 shows a top view of the pellet 8 wherein the outlet channels 1 radiate from the conical recess surrounding the central channel 3 and are arranged symmetrically to the channel 3. The outer diameter 6 of the conical recess 2 is about 76% of the total diameter 5 of the pellet and the radial length of the outlet channels is about 47% of the radius of the pellet. The depth of each of the outlet channels at the outer planar portion of the pellet are about 1/6 the height of the pellet.

Figure 4:
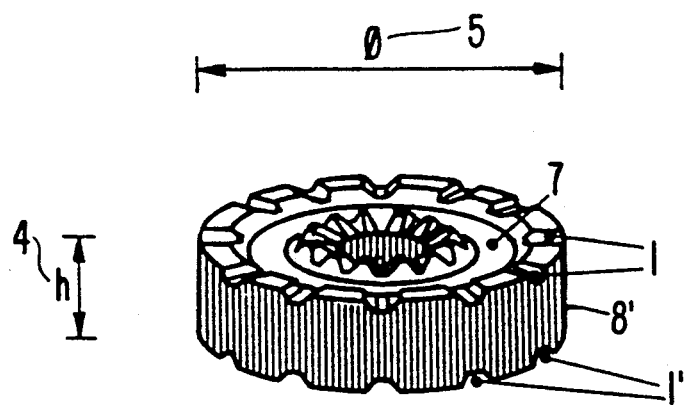
FIG. 4 is a perspective view of another embodiment of the pellet, this pellet having annular channels on the topside and bottom side of the pellet.
Figure 5:
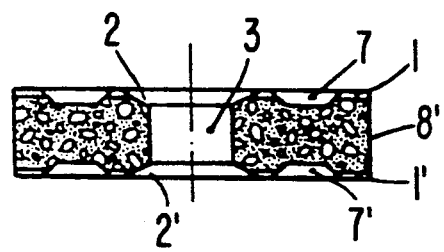
FIG. 5 is a cross-section of the pellet shown in FIG. 4.
Figure 6:
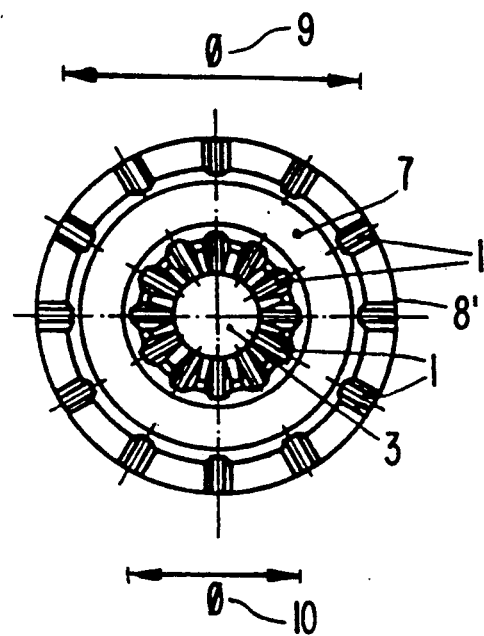
FIG. 6 is a top or plan view of the pellet shown in FIG. 4.

FIGS. 4-6 show, as heretofore noted, an embodiment according to this invention wherein annular channels 7 and 7' are formed in the topside and underside of the pellet. As shown in FIG. 4, the pellet 8' has a central channel 3 and conical recess 2, 2' surrounding the channel 3 on the topside and bottom side, respectively. Outlet channels 1, 1' are also formed in the portions of the pellet located adjacent to the annular channels 7, 7'. In FIG. 6, the outer diameter of the annular channel 7 is denoted by 9 and the inner diameter by 10. The width of the annular channel is about ¼ of the radius of the pellet. In these pellets, the ratio of diameter: height is about 3.6:1. The outlet channels each have a depth that is about 1/12 of the height of the pellet.

What is claimed is:

1. A ring pellet for gas generators formed of a gas-releasing material, said pellet having a central, axially symmetrical channel extending therethrough and outlet channels on the topside and/or underside of the pellet extending radially from the central channel to an outer rim or periphery of the pellet.

2. A ring pellet according to claim 1, wherein the outlet channels are arranged symmetrically to the central channel.

3. A ring pellet according to claim 1, wherein the pellet has on the topside and underside the same number of outlet channels.

4. A ring pellet according to claim 2, wherein the pellet has on the topside and underside the same number of outlet channels.

5. A ring pellet according to claim 1, wherein the outlet channels on the topside of the pellets are arranged offset with respect to the outlet channels on the underside of the pellet.

6. A ring pellet according to claim 2, wherein the outlet channels on the topside of the pellets are arranged offset with respect to the outlet channels on the underside of the pellet.

7. A ring pellet according to claim 1, wherein the outlet channels each have a depth corresponding maximally to one-third of the total height of the pellet.

8. A ring pellet according to claim 2, wherein the outlet channels each have a depth corresponding maximally to one-third of the total height of the pellet.

9. A ring pellet according to claim 1, wherein the central channel includes conical recesses arranged axially symmetrically and surrounding a central duct extending through the pellet in the topside and the underside of the pellet, respectively, the outlet channels terminating in said recesses.

10. A ring pellet according to claim 2, wherein the central channel includes conical recesses arranged axially symmetrically and surrounding a central duct extending through the pellet in the topside and the underside of the pellet, respectively, the outlet channels terminating in said recesses.

11. A ring pellet according to claim 9, characterized in that the pellet has a surface area/weight ratio ranging from 3 to 7 $cm^2/g$.

12. A ring pellet according to claim 10, characterized in that the pellet has a surface area/weight ratio ranging from 3 to 7 $cm^2/g$.

13. A ring pellet according to claim 1, wherein the pellet has a centrally symmetrical annular channel arranged between the central channel and the rim of the pellet.

14. A ring pellet according to claim 2, wherein the pellet has a centrally symmetrical annular channel arranged between the central channel and the rim of the pellet.

15. A ring pellet according to claim 13, wherein the pellet has a surface area/weight ratio ranging from 4 to 8 $cm^2/g$.

16. A ring pellet according to claim 9, wherein the pellet has a centrally symmetrical annular channel arranged between the central channel and the rim of the pellet.

17. A ring pellet according to claim 10, wherein the pellet has a centrally symmetrical annular channel arranged between the central channel and the rim of the pellet.

* * * * *